United States Patent [19]

Van Ausdall

[11] 3,994,656
[45] Nov. 30, 1976

[54] APPARATUS FOR FORMING TUBULAR PIPE COVERING SECTIONS

[75] Inventor: James G. Van Ausdall, Englewood, Colo.

[73] Assignee: Ceel-Co, Denver, Colo.

[22] Filed: Mar. 24, 1975

[21] Appl. No.: 561,349

[52] U.S. Cl. .................................. 425/391; 72/170; 72/146; 264/339; 425/445; 425/DIG. 200
[51] Int. Cl.² .................. B29C 17/02; B29D 23/12
[58] Field of Search ............. 425/174.4, 391, 305 R, 425/404, DIG. 200, DIG. 201, 445; 72/170, 174, 146, 148; 264/339, 295, 322

[56] References Cited
UNITED STATES PATENTS

| | | | |
|---|---|---|---|
| 1,837,209 | 12/1931 | Dallas | 72/146 |
| 1,999,751 | 4/1935 | Clayton | 425/445 |
| 2,071,137 | 2/1937 | Neidt | 72/146 X |
| 2,304,629 | 12/1942 | Eimmer | 425/391 X |
| 2,910,729 | 11/1959 | Schaller, Jr. et al. | 264/339 X |
| 3,020,596 | 2/1962 | Clapp et al. | 264/339 X |
| 3,241,182 | 3/1966 | Kessler | 425/DIG. 200 |
| 3,390,429 | 7/1968 | Palmai | 425/305 X |
| 3,499,072 | 3/1970 | Helling et al. | 264/339 X |
| 3,915,612 | 10/1975 | Gersbeck et al. | 425/DIG. 200 |

*Primary Examiner*—Robert L. Spicer, Jr.
*Attorney, Agent, or Firm*—Ancel W. Lewis, Jr.

[57] ABSTRACT

Apparatus and methods for forming generally tubular pipe covering sections with overlapping edge portions from a sheet of elastomeric material. For relatively thin material thicknesses the material is rolled on a male mandrel to provide a plurality of spiral wraps and this roll is heated to a selected temperature between 120° F and 150° F for at least 12 hours to effect a set in the roll. Selected lengths of the sheet material are cut from the roll to provide tubular pipe covering sections of a selected circumferential size. For relatively thick material thicknesses with substantial rigidity, a continuous roll of the material is cut transversely along its length to form a series of blanks. The length of the blank is established by the width of the roll and the width of the blank is selected according to the diameter of the pipe or insulated pipe to be covered. The blanks are preheated as they are carried on the upper stretch of an endless conveyor through a heater to a selected temperature between 120° F and 180° F for a relatively short time interval to remove any memory therein. The blank is then directed between successive pairs of power-driven rollers in a course of travel that imparts a curl to the blank to form a curled tubular section. The curled tubular section is then confined in a tubular female mandrel of a selected size and heated to a selected temperature of between 120° F and 150° F for between about 12 to 24 hours to effect a permanent set therein.

13 Claims, 11 Drawing Figures

U.S. Patent  Nov. 30, 1976  Sheet 1 of 2  3,994,656
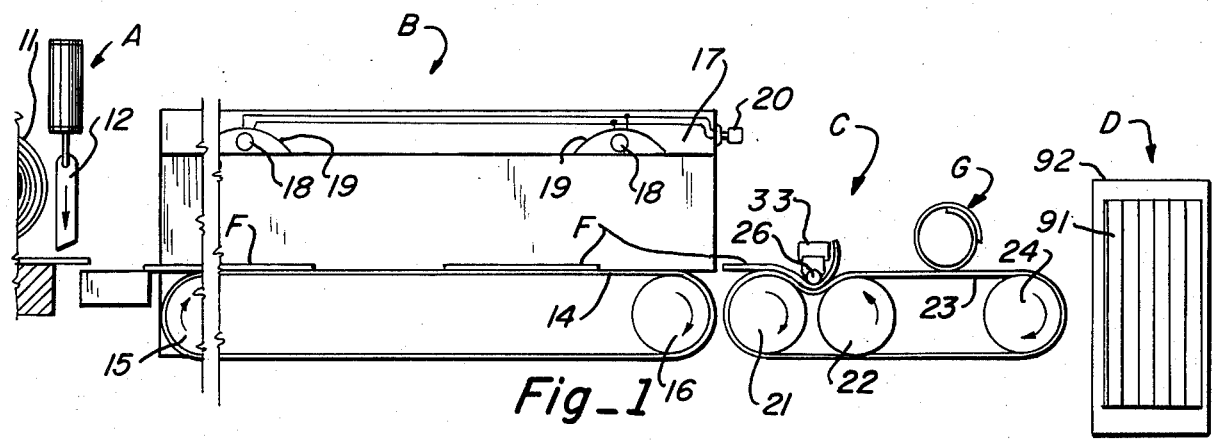
Fig_1
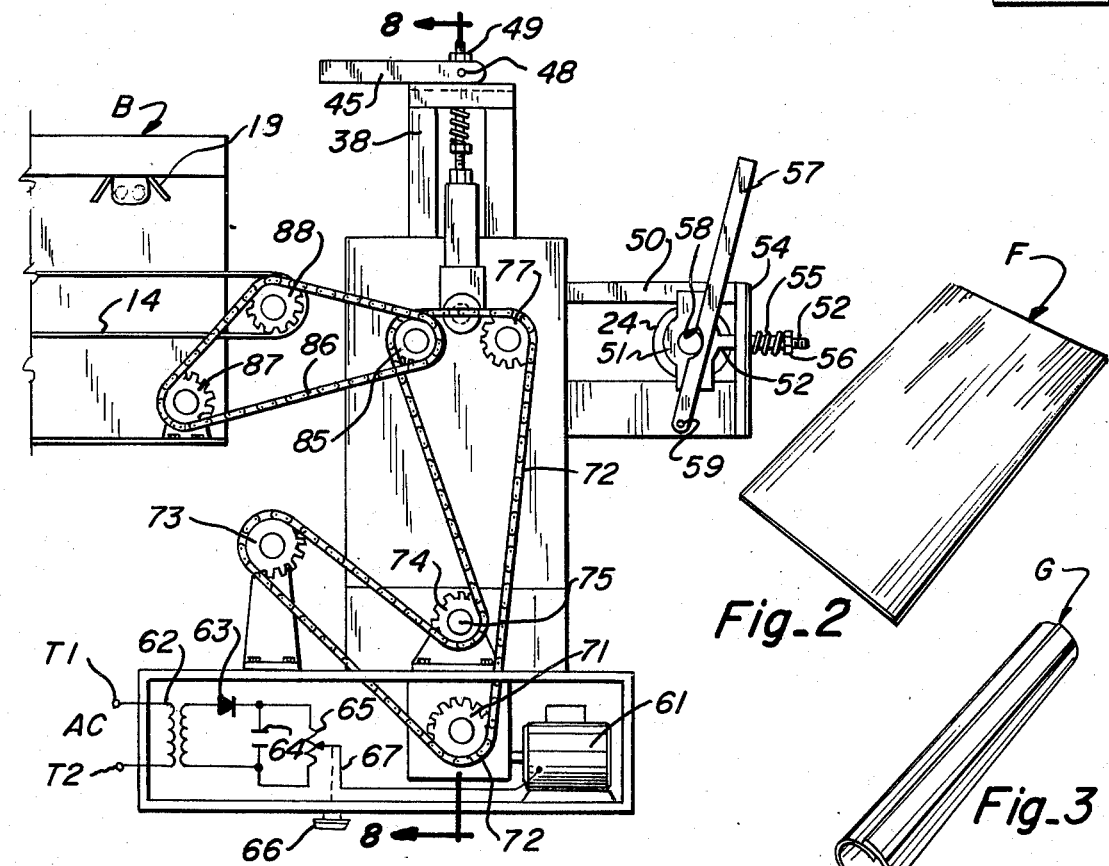
Fig_2
Fig_3
Fig_4
Fig_6
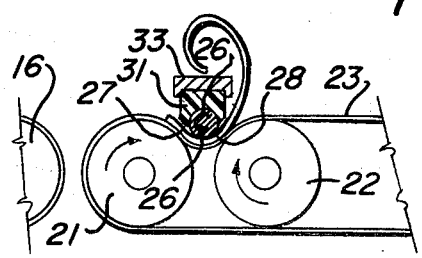
Fig_5

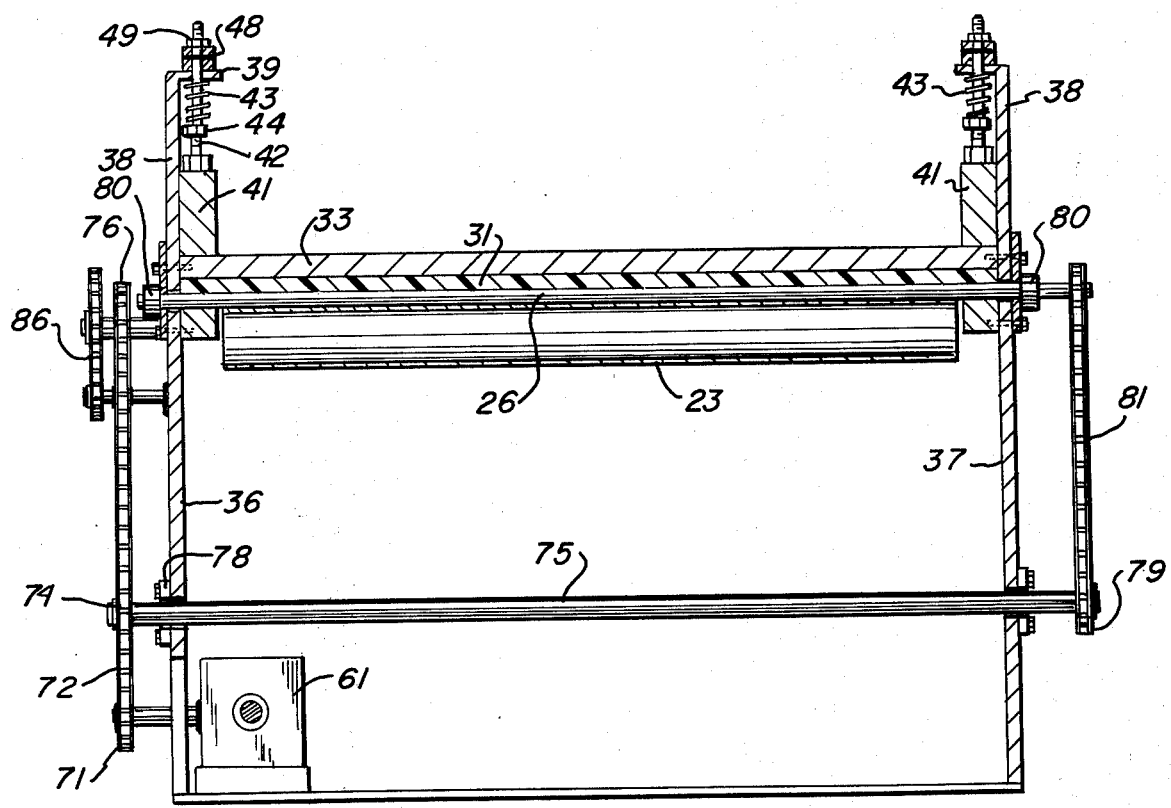
Fig_8
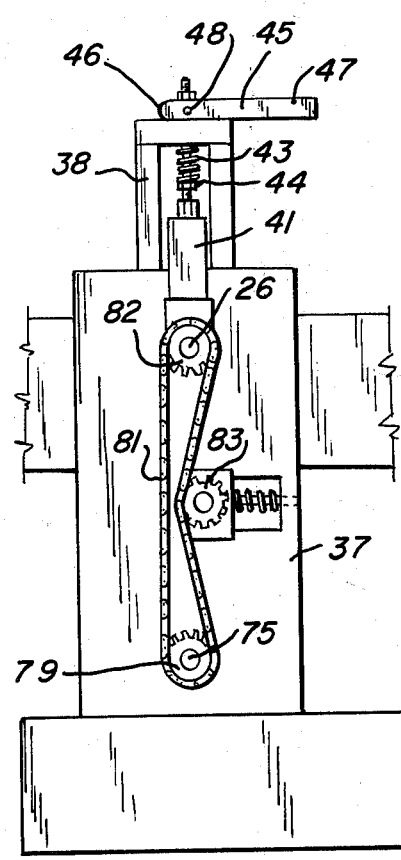
Fig_9
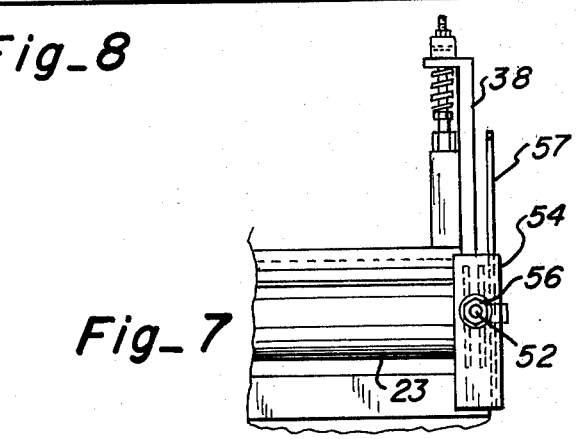
Fig_7
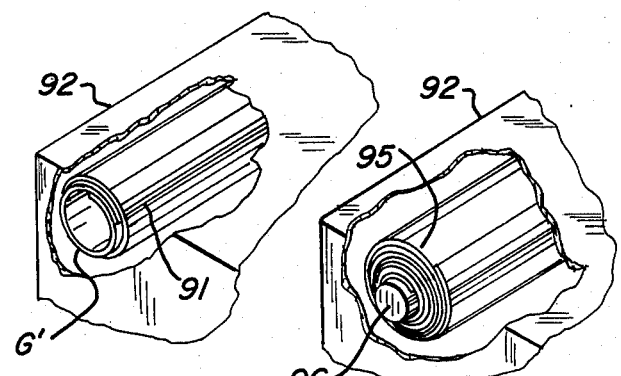
Fig_10      Fig_11

3,994,656

APPARATUS FOR FORMING TUBULAR PIPE COVERING SECTIONS

FIELD OF THE INVENTION

This invention relates to novel and imporved apparatus and methods for forming generally tubular pipe covering sections with overlapping edge portions that are especially suited for forming a protective covering system about pipe or an insulated pipe system.

BACKGROUND

There are a number of industrial plant installations where it is highly desirable to cover or fully enclose the pipes and particularly insulated pipes to protect them from corrosive, contaminating elements that might contribute to bacterial growth or dirt accumulation and the like. In many plant installations such as in meat packing plants, it is highly desirable to be able to periodically clean the covered pipe covering system using high pressure steam or the like. Tubular type pipe covering sections and the entire covering systems that hermetically seal fluid carrying pipes or insulated pipes in a plant have heretofore been provided for this purpose. The advantage of using curled tubular sections over flat sheets is that with thicker flat sheets there is difficulty in holding the overlapped edges together where with the curled tubular sections these overlapped edges hold firmly against one another. The practice then is to form a cold weld at the joint or seam using some form of adhesive.

In the U.S. Patent to Helling No. 3,560,287 there is described tubular covering sections made from blanks of thermoplastic material and in U.S. Patent to Helling No. 3,499,072 there are described apparatus and methods for forming such tubular pipe covering sections. In the apparatus and methods described in the latter Helling patent, it is the practice to heat the material between 175° F and 190° F and then simultaneously curl and cool the blanks. A significant difference between the practice of the Helling patent and the present invention is that in the present invention the initial heating is only to remove any memory, the curling is accomplished between a roller arrangement and then the blank is held in a wrapped form and heated to temperatures on the order of 120° F and 150° F for periods of time between about 12 and 24 hours. Under these circumstances the pre-heating is not critical and can be accomplished in an efficient relatively inexpensive manner and the curling is accomplished using a relatively simple roller arrangement.

Accordingly, it is a general object of the present invention to provide novel and improved methods for forming tubular pipe covering sections of a selected size from a sheet of elastomeric material.

Yet another object of the present invention is to provide a novel apparatus and methods of forming tubular pipe covering sections that does not require complex, expensive apparatus for the practice thereof.

Still a further object of this invention is to provide novel apparatus for forming generally tubular pipe covering sections that is reliable, relatively simple, easily operated and highly effective for producing relatively large quantities of different sizes of the product.

Another object of this invention is to provide novel apparatus for forming generally tubular pipe covering sections that will readily produce sections for a wide range of pipe diameters with a minimum of set up time.

Other objects, advantages and capabilities of the present invention will become more apparent as the description proceeds taken in conjunction with the accompanying drawings, in which:

FIG. 1 is a diagramatic side elevation view of apparatus suitable for forming generally tubular pipe covering sections in accordance with the present invention;

FIG. 2 is a perspective view of a flat blank of the material prior to its being formed into the curled tubular shape;

FIG. 3 is a perspective view of a curled tubular section made from the blank shown in FIG. 2;

FIG. 4 is a perspective view of a tubular section sealed at the joint formed at the overlapping edge portions to cover an insulated pipe;

FIG. 5 is an enlarged side elevation view illustrating in more detail the apparatus that curls the blank into a tubular section prior to the final setting treatment;

FIG. 6 is a side elevation view showing a portion of the curling rollers and the associated drive assembly;

FIG. 7 is a fragmentary front elevation view of the apparatus of FIG. 6;

FIG. 8 is a sectional view taken along lines 8—8 of FIG. 6;

FIG. 9 is a side elevation of the side of the apparatus opposite that of FIG. 6;

FIG. 10 is a fragmentary perspective view showing a curled tubular section in a female mandrel; and FIG. 11 is a perspective view of multiple spiral wraps of the material on a male mandrel in a heating oven.

SUMMARY OF THE INVENTION

In accordance with the present invention in preferred apparatus and methods described herein there is provided for the relatively thin material thicknesses, preferably a PVC material or the like, a mandrel in the form of a rod on which the material is first rolled. The roll is heat treated for a least 12 hours in an oven at between about 120° F and 150° F to effect a permanent set. Following the heat treating selected lengths of the material are cut from the roll to provide the pipe covering sections with overlapping edge portions. For relatively thick material thicknesses, preferably an ABS or PVC roll of sheet material, a series of blanks of a selected size are cut from the roll of the sheet material, pre-heated in an oven using infrared heaters while the blanks are being moved on the upper stretch of a belt conveyor. The blanks are then curled between a roller arrangement wherein two larger power-driven bottom curling rollers and a smaller power-driven top curling roller deflect the blank through an angle of about 90°. The curled blanks are placed in tubular mandrels of a selected size and heated for at least 12 hours in an oven to effect a permanent set in the tubular form.

DETAILED DESCRIPTION

The term "elastomeric material" as used herein indicates, in general, temperature sensitive rubber compounds as well as compounds of thermo-plastic or thermosetting resins. For this application, the material must be tough, strong and permeable, resist bacterial growth, dirt, corrosive chemicals and deterioration.

There are two types of thermosetting resins that have been found to be highly effective in the practice of the present invention. For those applications where material thickness and rigidity is desirable a thickness of about 28 mil is preferred. Material of this thickness may be an ABS (acrylonitrile butadiene styrene) plastic or a PVC (polyvinyl chloride) plastic. The PVC is more readily available in 20 mil or 10 mil thicknesses. The apparatus shown and described in FIGS. 1 through 10 hereinafter is particularly suited for handling the relatively thick material that has considerable rigidity at room temperatures. The relatively thin material thicknesses of 20 mil and 10 mil are used in applications where rigidity or thickness is not essential. The apparatus shown in FIG. 11 is particularly suitable for the relatively thin material thicknesses. It is understood, however, that the apparatus of FIGS. 1 through 10 can also be used to process the 20 mil thicknesses if desired.

Referring now to FIG. 1, there is shown in a diagramatic form apparatus and a procedure for forming generally tubular pipe covering sections that is particularly suitable for materials in a layer thickness category such as 28 mil ABS plastic or PVC plastic. The apparatus shown, in general, comprises a cutting station A, a preheating station B, a curling station C and a final setting station D. FIGS. 2 and 3 illustrate a substantially flat rectangular blank F and a curled tubular section G made from the flat blank F, respectively. FIG. 4 shows the curled tubular section designated G' encircling a tubular pipe section P surrounded by insulation S. Typically, the joint is closed or sealed along the overlapping edge portions by an adhesive or like cold weld as represented at T.

The elastomeric material used in the method and apparatus shown in FIG. 1 is provided in a roll designated 11 and is shown as being cut transversely of its length in a selected length by a blade 12 to form the blank F. The length of the cut along the roll establishes the diameter of the tubular section G along the pipe being covered. A typical width of rolled sheet material of the above-discussed plastic is 4 feet. By varying the length of the cut along the roll by the control of the blade 12, it is possible to have a range of sizes of blanks for different pipe diameters. Typically, the pipe diameters that are being covered vary from 2 inches to 32 inches in one-half increments.

The blanks F are cut from the roll 11 at ambient or room temperature and the relatively thick material will normally have a tension or memory therein. The heating station B functions to remove this memory. The apparatus shown at the heating station B includes an endless conveyor belt 14 of a suitable width supported for movement by an upstream idler roller 15 and a downstream power-driven roller 16. The heating apparatus shown has a hood or superstructure 17 above the conveyor belt 14 that carries infrared heating elements 18. Each element 18 has a reflector 19 to reflect the heat toward the conveyor belt to heat the blanks F as they are conveyed on belt 14. The heating elements 18 are rod-like in character and extend transversely of the hood 17 and the direction of movement of the conveyor belt 14. A CAL-ROD infrared heater has been found suitable for this purpose. The concave deflector 19 is behind each heating element 18 to direct the heat toward the conveyor surface in overlapping patterns. A control device 20 is used to set the time-on interval for the heating elements 18. For example, the heating elements may be on only 90% of the time that a blank travels from the inlet end to the outlet end of the upper stretch of belt 14. In the preheating stage the blanks may be heated at temperatures between about 120° F and 180° F, preferably about 170° F, for a period of time usually between about 20 seconds and 50 seconds, preferably about 35 seconds, while supported on the upper stretch of belt 14. The smaller the diameter of the covering section, the hotter the temperature. Lower temperatures at slower conveyor rates may be used.

The apparatus shown at the curling station C includes a pair of closely spaced power-driven bottom rollers herein referred to as the upstream bottom curling roller 21 and downstream bottom curling roller 22. The bottom curling rollers 21 and 22 are of a corresponding diameter with the centers thereof arranged on a common horizontal line. These rollers are driven in the same clockwise direction as shown in FIGS. 1 and 5 to move each blank F away from the heating conveyor as described in more detail hereinafter. An endless web 23 preferably made of a fabric material is trained over rollers 21 and 22 and further around a downstream conveying roller 24 of a diameter that corresponds in size with rollers 21 and 22 and is disposed with its center on the common horizontal line. A smaller power-driven top curling roller 26 in the form of a solid metal rod is positioned above and midway between the curling rollers 21 and 22 and is driven in the same counterclockwise direction as shown. The smaller top curling roller 26 is of a considerably smaller diameter than the bottom curling rollers 21 and 22 with its center located within a common tangent line across the top of rollers 21 and 22 and is spaced a selected distance from the first roller sufficient to form a gap designated 27 through which the blank F passes. As blank F leaves the heating conveyor belt 14 it is directed downwardly at an approximate 45° angle to the horizontal. The downstream bottom curling roller 22 with the top curling roller 26 forms a second gap designated 28, through which the blank is passed after it leaves the gap 27 and is directed and urged by web 28 upwardly at an angle of about 45° to the horizontal so that the course of travel for the blank through the two gaps 27 and 28 is an approximate 90° angle which has the effect of forming a curl in the blank to form the curled tubular section designated G. The purpose and function of this roller arrangement then is to direct the blank along a first course of travel and then abruptly change this course of travel by passing it along a second course of travel that is angularly disposed relative to the first course of travel. The angle between the two courses of travel shown in the preferred embodiment is about 90°. It is understood, however, that this angle can vary to some extent as long as it is abrupt enough to cause a curling effect and it is not expected that this angle would be greater than 120° or less than 60°. The spacing between the rollers 21, 22 and 26 to form gaps 27 and 28 is of a size related to the thickness of the material and such that the rollers grip the material to move it through the gaps.

The mounting for the top curling roller 26 is provided by an elongated bearing bar 31 made of nylon impregnated with graphite which has a circular socket area that extends more than a semi-circle around the roller 26 to support it for rotational movement. In turn, the bearing bar 31 is supported in a notch or recess in the bottom of an elongated pressure bar 33 to which a downward pressure is applied at each end as is described fully hereinafter.

Referring now to FIGS. 6, 7 and 8, the apparatus at the curling station C is shown in more detail to include a support frame having a pair of opposed laterally spaced upright side walls 36 and 37 in which each of the rollers 21, 22 and 24 are carried on shafts that are suitably journaled in bearings at the opposite ends thereof.

The pressure bar 33 is arranged so that a selected, adjustable amount of downward pressure is applied to the top curling roller 26 through the pressure bar 33. This pressure applying arrangement is the same on both end portions of the pressure bar so that a description of one applies to both. There is mounted on each side wall an inverted stationary frame 38 with an inturned flange portion 39 at the top. An upright support block 41 is mounted on the top at each end of the pressure bar 33 and an externally threaded shaft 42 is secured to the top of the upright support block 41 and shaft 42 extends through an aperture and moves freely in the inturned top portion 39. A compression spring 43 is mounted between each top portion 39 and a nut 44 threaded on the shaft 42 above the upright support. A fork-shaped pivotal lever 45 is pivotally mounted on the end of the shaft 42 above portion 39. Lever 45 has opposed arms each with a cam 46 and a handle portion 47 opposite the cam 46. The lever 45 is pivoted at the forked arms about a pivot pin 48. The nut 49 is threaded on the top of shaft 42 to further hold the lever 45 in place for pivotal movement. In this way the spring 43 is held under compression between nut 44 and top portion 39 to exert a downward force on the pressure bar at the opposite ends thereof. A change in the compression on the spring 43 and thereby the force exerted downwardly on the pressure bar is accomplished by threading the nut 44 up on the associated shaft 42. The lever further provides a means by which when the handle portion is raised to an upright position raises the pressure bar 33 and associated top curling roller away from the bottom curling rollers.

There is further provided side support structure 50 that forms similar extensions of each of the side walls 36 and 37. Each side support 50 carries the downstream conveyor roller 24 which is rotatably mounted or journaled at opposite ends thereof in an end bearing and housing designated 51. Each end bearing and housing 51 is arranged with upper and lower flange portions that slide in a track formed by providing a window shown in each side support structure 50. An adjustable spring tension arrangement biases the conveyor roller 24 in a direction away from the other curling rollers to maintain the tension on the continuous web 23. This bias is accomplished by the provision of a shaft 52 attached at one end to an associated bearing housing 51 at each end of the shaft of roller 24. The shaft 52 extends through an aperture in support frame structure 54 opposite of the end of the shaft of roller 24. Spring 55 is arranged on the shaft 52 between frame structure 54 and has an adjustable nut 56 at the outer end so that a threading of the nut on the shaft changes the compression or force applied to the shaft 52 which in turn resiliently urges the conveyor roller 24 away from the curling rollers 21 and 22. A lever 57 with a notched portion 58 is provided on each side of the apparatus for engaging the end portions of the shaft of the conveyor roller 24 and allows the operator to urge the roller 24 forwardly to release the tension on the endless web 23 when desired.

The drive and drive train for the apparatus above described is shown to comprise a variable speed DC motor 61 that is supplied AC power from a suitable AC power supply or outlet and input terminals T1 and T2. A conventional AC to DC motor control is illustrated as including a transformer 62, a diode 63 in series with the secondary of the transformer, and a capacitor 64 together with a rheostat 65 connected across the capacitor 64 having a control knob 66 to vary the speed from zero to a maximum rpm for the DC motor in a conventional manner.

The output shaft of the motor 61 carries a main sprocket 71 over which there is trained a chain 72 that extends around an idler sprocket 73 and a sprocket 74 on one end of the cross shaft 75 together with sprockets 76 and 77 on the shafts of the curling rollers 21 and 22, respectively, so as to provide for conjointly or simultaneously driving all three of the curling rollers. The cross shaft 75 is journaled in suitable bearings 78 in the side supports 36 and 37 and carries a sprocket 79 on the end opposite sprocket 74 over which is trained a chain 81 which in turn is coupled to a sprocket 82 on the smaller top curling roller as best seen in FIG. 5. A biased idler sprocket 83 is biased by a spring bias arrangement 84 to maintain tension on chain 81 to facilitate the raising and lowering of the pressure bar.

Another sprocket 85 on the shaft of the upstream curling roller 21 has a chain 86 that extends around an idler sprocket 87 and a sprocket 88 on the heater conveyor roller 16 so that the heater conveyor belt 14 is driven by the same motor and at the same time all of the curling rollers are being driven.

After curling, the tubular sections designated G are inserted into a female mandrel in the form of a tube 91 shown as having an internal diameter of a selected size and they are inserted into an oven 92. The oven heats the tubular forms in the mandrel 91 between 120° F and 150° F for at least 12 hours and may heat them as long as 24 hours to establish a set or permanent shape for the tubular sections which is designated G'.

In an alternative method of forming the tubular sections that is particularly suitable for thinner materials such as the 10 or 20 mil PVC sheet material, the sheet material represented at 95 is spirally wrapped or rolled on a male mandrel 96 such as a metal rod. This rolled material is inserted into the setting oven 92 and held at a temperature of about 120° F to 150° F for at least 12 hours or may be heated as long as 24 hours for the permanent set. The roll of the sheet material is then cut into lengths which maintain the form of the tubular pipe covering sections designated G'.

By way of illustration only and not by way of limitation there is listed below devices which have been found suitable for use in a preferred embodiment of the illustrated apparatus.

| | | |
|---|---|---|
| 1. | Bottom rollers 21 and 22 | 3" O.D. |
| 2. | Top roller 26 | 3/4" O.D. |
| 3. | Length of Heater Cover 17 | 8' |
| 4. | Width of Conveyor Belt 14 | 4' |
| 5. | Male Mandrel | 1/4" O.D. |
| 6. | Female Mandrel | 2" I.D. tubing |
| 7. | Width of curling rollers 21, 22, 26 and web 23 | 4' |

Although the present invention has been described with a certain degree of particularity, it is understood that the present disclosure has been made by way of example and that changes in details of structure may be made without departing from the spirit thereof.

What is claimed is:

1. In apparatus for forming generally tubular sections from a substantially flat sheet of an elastomeric material, the combination comprising:
 first means for heating a substantially flat sheet of the material to remove any memory therein;
 a power-driven curling roller having a circular transverse cross section and a moving web opposite said curling roller, said web arranged for urging said heated sheet of material against less than a semicircular segment of the peripheral surface area of said curling roller by means directing the sheet of material along a first course of travel and then directing the sheet along a second course of travel at a selected angle to the first course of travel as said sheet of material is urged against said segment of said curling roller and moved along by the movement of said curling roller and web to curl the sheet of material into a tubular form with overlapping edge portions; and
 second means for heating the tubular form while being confined to a selected size and shape at a temperature range and for a time sufficient to effect a set in the tubular form.

2. In apparatus as set forth in claim 1 wherein said first heating means is in the form of a plurality of transverse rods at spaced intervals along the course of travel for the sheet material, each said rod having deflector means for directing infrared heat against the sheet of material.

3. In apparatus as set forth in claim 1 including:
 first and second closely spaced rollers driven in the same direction and in engagement with said web and said curling roller positioned between said first and second rollers, said first and curling rollers and web defining a first course of travel for the sheet material, said second and curling rollers and web defining a second course of travel for the sheet material that is at an angle of between about 60° to 120° to the first course of travel to cause the sheet of material to curl into a tubular form with overlapping edge portions.

4. In apparatus as set forth in claim 3 further including a fourth conveyor roller downstream of the second roller, said web being continuous and trained over said first and fourth rollers to direct the sheet material along said second course of travel and having an upper stretch downstream of said curling roller adapted to carry the curled tubular form away from said curling roller.

5. In apparatus as set forth in claim 3 wherein said first and second rollers have substantially the same external diameter, said curling roller being of a substantially smaller diameter than said first and second rollers.

6. In apparatus as set forth in claim 3 wherein the center of said curling roller is located within a common line tangent to each of said first and second rollers and midway between the centers of said first and second rollers.

7. In apparatus as set forth in claim 1 including an elongated bearing bar with a socket area extending substantially the full extent of the curling roller in which the curling roller is supported for rotation, said curling roller being in the form of a solid rod.

8. In apparatus as set forth in claim 7 wherein said bearing bar is made of a nylon material impregnated with a graphite and the socket portion encircles more than approximately one-half of said curling roller.

9. In apparatus as set forth in claim 7 including adjustable force applying means to resiliently urge the bearing bar and curling roller toward the first and second rollers.

10. In apparatus as set forth in claim 3 wherein said fourth roller is slidably mounted for movement toward and away from said second roller and adjustable force applying means to resiliently urge the fourth roller away from the second roller to tension said continuous web.

11. In apparatus as set forth in claim 10 including lever means to move the fourth roller toward the second roller to release the tension on the continuous web.

12. In apparatus as set forth in claim 1 including adjustable drive means for simultaneously driving said first, second and third roller means at a selected speed.

13. In apparatus for forming generally tubular pipe covering sections with overlapping edge portions from a roll of an elastomeric material, the combination comprising:
 means for selectively cutting the roll of elastomeric material transversely along the length thereof as the roll is unwound to form a series of substantially flat blanks of the material;
 a heater having an endless conveyor for receiving and conveying the blanks and a plurality of transverse infrared heating rods with deflectors above and spaced along the endless conveyor for heating the blanks as they are conveyed on the endless conveyor;
 a roller assembly in receiving relation to said heater arranged to curl each blank into a tubular form with overlapping edge portions, said roller assembly including,
 first and second closely spaced curling rollers supported at opposite ends for rotation,
 a third curling roller mounted between said first and second curling rollers defining a first course of travel for each blank in a first gap between said first and third curling rollers and defining a second course of travel for each blank in a second gap between said second and third curling rollers, said first and second gaps being at an angle of about 90° so as to cause the blank to be curled in a tubular form,
 said third roller being supported by an elongated pressure bar carrying a bearing bar with a socket area, said pressure bar being spring mounted at opposite ends so as to resiliently urge the third curling roller toward the first and second curling rollers;
 a pivotal lever arm at each end of the pressure bar to move the third roller away from the first and second rollers;
 a fourth conveyor roller mounted downstream of said second roller;
 a continuous web trained over said first and fourth rollers to direct the blank through said second gap and having an upper stretch to carry the curled tubular form away from said curling rollers, said fourth roller being slidably mounted at the opposite ends to move toward and away from said second roller and having adjustable force applying springs at opposite ends to resiliently urge said fourth roller away from said second roller to tension said continuous web;

a lever at each end of said fourth roller for moving the roller toward the second roller to selectively release the tension on the continuous web;

a variable speed drive arranged for simultaneously driving said heater conveyor and said first, second and third conveyors;

a tubular die for confining each tubular form in a desired size; and an oven for heating each confined tubular form at a temperature between about 120° F and 160° F for a time interval of about between 12 and 24 hours to effect a permanent set in each curled tubular form.

* * * * *